(12) United States Patent
Gathala et al.

(10) Patent No.: US 9,349,001 B2
(45) Date of Patent: May 24, 2016

(54) METHODS AND SYSTEMS FOR MINIMIZING LATENCY OF BEHAVIORAL ANALYSIS

(71) Applicant: QUALCOMM Incorporated, San Diego, CA (US)

(72) Inventors: Sudha Anil Kumar Gathala, Santa Clara, CA (US); Rajarshi Gupta, Sunnyvale, CA (US); Saumitra Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/749,948

(22) Filed: Jan. 25, 2013

(65) Prior Publication Data

US 2013/0305358 A1 Nov. 14, 2013

Related U.S. Application Data

(60) Provisional application No. 61/646,590, filed on May 14, 2012, provisional application No. 61/683,274, filed on Aug. 15, 2012.

(51) Int. Cl.
*G06F 21/55* (2013.01)
*G06F 21/56* (2013.01)
(Continued)

(52) U.S. Cl.
CPC .......... *G06F 21/552* (2013.01); *G06F 11/1433* (2013.01); *G06F 11/1458* (2013.01);
(Continued)

(58) Field of Classification Search
CPC .............. G06F 11/3006; G06F 21/552; G06F 11/3082; G06F 11/3409; G06F 21/50; H04W 4/00; H04W 52/0209; H04W 24/00; H04W 52/0251; H04W 12/12; G06N 5/043; H04L 41/06
USPC .................................................. 726/4, 23, 24
See application file for complete search history.

(56) References Cited

U.S. PATENT DOCUMENTS 5,870,735 A 2/1999 Agrawal et al.
6,532,541 B1 3/2003 Chang et al.
(Continued)

FOREIGN PATENT DOCUMENTS

CN 102591696 A 7/2012
EP 1182552 A2 2/2002
(Continued)

OTHER PUBLICATIONS

Qin, Feng, "System Support for Improving Software Dependability During Production Runs," BE Univ. of Science and Technology of China, 1998.
(Continued)

*Primary Examiner* — Saleh Najjar
*Assistant Examiner* — Louis Teng
(74) *Attorney, Agent, or Firm* — Shirin Tefagh

(57) ABSTRACT

The various aspects include methods, systems, and devices configured to make use of caching techniques and behavior signature caches to improve processor performance and/or reduce the amount of power consumed by the computing device by reducing analyzer latency. The signature caching system may be configured to adapt to rapid and frequent changes in behavioral specifications and models and provide a multi-fold improvement in the scalability of behavioral analysis operations performed on the mobile device.

16 Claims, 7 Drawing Sheets

(51) Int. Cl.
  *G06F 11/14* (2006.01)
  *G06F 11/30* (2006.01)
  *H04W 52/02* (2009.01)
  *H04W 24/08* (2009.01)
  *G06F 11/34* (2006.01)
  *H04W 12/12* (2009.01)
  *H04W 88/02* (2009.01)
  *H04L 29/06* (2006.01)

(52) U.S. Cl.
  CPC ........ *G06F 11/3006* (2013.01); *G06F 11/3082* (2013.01); *G06F 11/3466* (2013.01); *G06F 21/554* (2013.01); *G06F 21/56* (2013.01); *H04W 24/08* (2013.01); *H04W 52/0251* (2013.01); *H04W 52/0258* (2013.01); *G06F 11/3409* (2013.01); *G06F 11/3476* (2013.01); *G06F 2201/86* (2013.01); *H04L 63/1433* (2013.01); *H04W 12/12* (2013.01); *H04W 88/02* (2013.01); *Y02B 60/165* (2013.01)

(56) References Cited

U.S. PATENT DOCUMENTS

| | | |
|---|---|---|
| 6,643,802 B1 | 11/2003 | Frost et al. |
| 7,051,327 B1 | 5/2006 | Milius et al. |
| 7,401,359 B2 | 7/2008 | Gartside et al. |
| 7,559,053 B2 | 7/2009 | Krassovsky et al. |
| 7,561,877 B2 | 7/2009 | Cassett et al. |
| 7,571,478 B2 | 8/2009 | Munson et al. |
| 7,600,014 B2 | 10/2009 | Russell et al. |
| 7,650,317 B2 | 1/2010 | Basu et al. |
| 7,676,573 B2 * | 3/2010 | Herzog et al. ............... 709/224 |
| 7,694,150 B1 | 4/2010 | Kirby |
| 7,757,292 B1 | 7/2010 | Renert et al. |
| 7,774,599 B2 | 8/2010 | Guo et al. |
| 7,831,237 B2 | 11/2010 | Passarella et al. |
| 7,831,248 B2 | 11/2010 | Lee |
| 7,849,360 B2 | 12/2010 | Largman et al. |
| 7,877,621 B2 | 1/2011 | Jacoby et al. |
| 7,881,291 B2 | 2/2011 | Grah |
| 7,890,443 B2 | 2/2011 | Zhang et al. |
| 7,945,955 B2 | 5/2011 | Katkar |
| 8,045,958 B2 | 10/2011 | Kahandaliyanage |
| 8,087,067 B2 | 12/2011 | Mahaffey et al. |
| 8,095,964 B1 * | 1/2012 | Zhong et al. ............... 726/4 |
| 8,161,548 B1 | 4/2012 | Wan |
| 8,201,244 B2 | 6/2012 | Sun et al. |
| 8,201,249 B2 | 6/2012 | McCallam |
| 8,225,093 B2 | 7/2012 | Fok et al. |
| 8,245,295 B2 | 8/2012 | Park et al. |
| 8,245,315 B2 | 8/2012 | Cassett et al. |
| 8,266,698 B1 | 9/2012 | Seshardi et al. |
| 8,311,956 B2 | 11/2012 | Sen et al. |
| 8,312,545 B2 | 11/2012 | Tuvell et al. |
| 8,321,941 B2 * | 11/2012 | Tuvell et al. ............... 726/24 |
| 8,331,987 B2 | 12/2012 | Rosenblatt |
| 8,332,945 B2 | 12/2012 | Kim et al. |
| 8,347,386 B2 | 1/2013 | Mahaffey et al. |
| 8,397,301 B2 | 3/2013 | Hering et al. |
| 8,443,439 B2 | 5/2013 | Lamastra et al. |
| 8,458,809 B2 | 6/2013 | Adams et al. |
| 8,516,584 B2 | 8/2013 | Moskovitch et al. |
| 8,533,844 B2 | 9/2013 | Mahaffey et al. |
| 8,554,912 B1 | 10/2013 | Reeves et al. |
| 8,694,744 B1 | 4/2014 | Raj et al. |
| 8,701,192 B1 * | 4/2014 | Glick et al. ............... 726/24 |
| 8,762,298 B1 | 6/2014 | Ranjan et al. |
| 8,763,127 B2 | 6/2014 | Yao et al. |
| 8,775,333 B1 | 7/2014 | Zahn |
| 2002/0099756 A1 | 7/2002 | Catthoor et al. |
| 2004/0039924 A1 | 2/2004 | Baldwin et al. |
| 2004/0068721 A1 | 4/2004 | O'Neill et al. |
| 2004/0083366 A1 | 4/2004 | Nachenberg et al. |
| 2004/0221163 A1 | 11/2004 | Jorgensen et al. |
| 2005/0144480 A1 | 6/2005 | Kim et al. |
| 2006/0026464 A1 | 2/2006 | Atkin et al. |
| 2006/0085854 A1 | 4/2006 | Agrawal et al. |
| 2006/0288209 A1 | 12/2006 | Vogler |
| 2007/0006304 A1 | 1/2007 | Kramer et al. |
| 2007/0136455 A1 | 6/2007 | Lee et al. |
| 2007/0192866 A1 | 8/2007 | Sagoo et al. |
| 2007/0199060 A1 | 8/2007 | Touboul |
| 2007/0220327 A1 | 9/2007 | Ruscio et al. |
| 2007/0283170 A1 | 12/2007 | Yami et al. |
| 2007/0287387 A1 | 12/2007 | Keum et al. |
| 2007/0294768 A1 | 12/2007 | Moskovitch et al. |
| 2008/0016339 A1 | 1/2008 | Shukla |
| 2008/0026464 A1 | 1/2008 | Borenstein et al. |
| 2008/0046755 A1 | 2/2008 | Hayes |
| 2008/0047009 A1 | 2/2008 | Overcash et al. |
| 2008/0086773 A1 | 4/2008 | Tuvell et al. |
| 2008/0109495 A1 | 5/2008 | Herberger et al. |
| 2008/0140821 A1 | 6/2008 | Tada |
| 2008/0162686 A1 * | 7/2008 | Kalaboukis et al. ............... 709/224 |
| 2008/0163382 A1 | 7/2008 | Blue et al. |
| 2008/0172746 A1 | 7/2008 | Lotter et al. |
| 2008/0228429 A1 | 9/2008 | Huang et al. |
| 2009/0019546 A1 | 1/2009 | Park et al. |
| 2009/0019551 A1 | 1/2009 | Haga et al. |
| 2009/0199296 A1 | 8/2009 | Xie et al. |
| 2009/0217078 A1 | 8/2009 | Cassett et al. |
| 2009/0239531 A1 | 9/2009 | Andreasen et al. |
| 2009/0287618 A1 | 11/2009 | Weinberger et al. |
| 2009/0288080 A1 | 11/2009 | Partridge |
| 2009/0288164 A1 | 11/2009 | Adelstein et al. |
| 2009/0300765 A1 | 12/2009 | Moskovitch et al. |
| 2009/0327168 A1 | 12/2009 | Weinberger et al. |
| 2010/0011029 A1 | 1/2010 | Niemelae |
| 2010/0036786 A1 | 2/2010 | Pujara |
| 2010/0082513 A1 | 4/2010 | Liu |
| 2010/0105404 A1 | 4/2010 | Palanki et al. |
| 2010/0107257 A1 | 4/2010 | Ollmann |
| 2010/0128125 A1 | 5/2010 | Warzelhan |
| 2010/0153371 A1 | 6/2010 | Singh |
| 2010/0154032 A1 | 6/2010 | Ollmann |
| 2010/0175135 A1 | 7/2010 | Kandek et al. |
| 2010/0192201 A1 | 7/2010 | Shimoni et al. |
| 2010/0241974 A1 | 9/2010 | Rubin et al. |
| 2010/0251340 A1 | 9/2010 | Martin et al. |
| 2010/0262693 A1 | 10/2010 | Stokes et al. |
| 2010/0296496 A1 | 11/2010 | Sinha et al. |
| 2010/0299292 A1 | 11/2010 | Collazo |
| 2010/0313269 A1 | 12/2010 | Ye |
| 2011/0004935 A1 | 1/2011 | Moffie et al. |
| 2011/0013528 A1 | 1/2011 | Chen |
| 2011/0023118 A1 | 1/2011 | Wright |
| 2011/0060948 A1 | 3/2011 | Beebe |
| 2011/0105096 A1 * | 5/2011 | Dods et al. ............... 455/418 |
| 2011/0145920 A1 | 6/2011 | Mahaffey et al. |
| 2011/0161452 A1 | 6/2011 | Poornachandran et al. |
| 2011/0219449 A1 | 9/2011 | St. Neitzel et al. |
| 2011/0264764 A1 | 10/2011 | Kewalramani et al. |
| 2011/0286437 A1 | 11/2011 | Austin et al. |
| 2011/0302654 A1 | 12/2011 | Miettinen |
| 2011/0302656 A1 | 12/2011 | El-Moussa |
| 2011/0307233 A1 | 12/2011 | Tseng et al. |
| 2012/0016633 A1 | 1/2012 | Wittenstein et al. |
| 2012/0051228 A1 | 3/2012 | Shuman et al. |
| 2012/0060219 A1 * | 3/2012 | Larsson et al. ............... 726/23 |
| 2012/0096539 A1 | 4/2012 | Hu et al. |
| 2012/0110174 A1 | 5/2012 | Wootton et al. |
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1 | 6/2012 | McReynolds |
| 2012/0167218 A1 | 6/2012 | Poornachandran et al. |
| 2012/0180126 A1 | 7/2012 | Liu et al. |
| 2012/0207046 A1 | 8/2012 | Di et al. |
| 2012/0210423 A1 | 8/2012 | Friedrichs et al. |
| 2012/0227105 A1 | 9/2012 | Friedrichs et al. |
| 2012/0233694 A1 | 9/2012 | Baliga et al. |
| 2012/0245481 A1 | 9/2012 | Blanco et al. |

(56) References Cited

U.S. PATENT DOCUMENTS

| | | |
|---|---|---|
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2013/0014262 A1 | 1/2013 | Lee et al. |
| 2013/0031600 A1 | 1/2013 | Luna et al. |
| 2013/0066815 A1 | 3/2013 | Oka et al. |
| 2013/0073983 A1 | 3/2013 | Rasmussen et al. |
| 2013/0097706 A1* | 4/2013 | Titonis et al. .................. 726/24 |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0203440 A1 | 8/2013 | Bilange et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303154 A1 | 11/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305359 A1 | 11/2013 | Gathala et al. |
| 2014/0007183 A1 | 1/2014 | Qureshi et al. |
| 2014/0051432 A1 | 2/2014 | Gupta et al. |
| 2014/0053260 A1 | 2/2014 | Gupta et al. |
| 2014/0053261 A1 | 2/2014 | Gupta et al. |
| 2014/0096246 A1 | 4/2014 | Morrissey et al. |
| 2014/0150100 A1 | 5/2014 | Gupta et al. |
| 2014/0187177 A1 | 7/2014 | Sridhara et al. |
| 2014/0188781 A1 | 7/2014 | Fawaz et al. |
| 2014/0205099 A1 | 7/2014 | Christodorescu et al. |
| 2014/0237595 A1 | 8/2014 | Sridhara et al. |
| 2014/0245306 A1 | 8/2014 | Gathala et al. |
| 2014/0279745 A1 | 9/2014 | Esponda et al. |
| 2014/0317734 A1 | 10/2014 | Valencia et al. |
| 2014/0337862 A1 | 11/2014 | Valencia et al. |
| 2015/0148109 A1 | 5/2015 | Gupta et al. |
| 2015/0356462 A1 | 12/2015 | Fawaz et al. |

FOREIGN PATENT DOCUMENTS

| | | |
|---|---|---|
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2680182 A1 | 1/2014 |
| TW | 200937198 A | 9/2009 |
| TW | 201239618 A | 10/2012 |
| WO | 2010048502 | 4/2010 |
| WO | 2010126416 A1 | 11/2010 |
| WO | 2011147580 A1 | 12/2011 |
| WO | 2013016692 | 1/2013 |
| WO | WO-2013080096 A1 | 6/2013 |
| WO | 2013172865 A1 | 11/2013 |
| WO | 2013173003 A2 | 11/2013 |
| WO | 2013173044 A2 | 11/2013 |

OTHER PUBLICATIONS

Wang, Yin-Min et al., "STRIDER: A Black-box, State-based Approach to Change and Configuration Management and Support," Microsoft Research, 2003 LISA XVII, San Diego, Oct. 26-31, 2003, pp. 165-178.

Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.

Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.

Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012, pp. 349-358, XP55086347, ISSN: 2249-955.

Shabtai A., "Malware Detection on Mobile Devices," Eleventh International Conference on Mobile Data Management, IEEE Computer Society, 2010, pp. 289-290.

Sheen S., et al., "Network Intrusion Detection using Feature Selection and Decision tree classifer," TENCON—IEEE Region 10 Conference, 2008, pp. 1-4.

Caruana, et al., "An Empirical Comparison of Supervised Learning Algorithms", ICML, 2006, 8 pgs.

Caruana, et al., "An Empirical Evaluation of Supervised Learning in High Dimensions", ICML, 2008, 8 pgs.

Co-pending U.S. Appl. No. 13/558,527, filed Jul. 26, 2012.

International Search Report and Written Opinion—PCT/US2013/023646—ISA/EPO—Jul. 16, 2013.

Shabtai A., et al., "Dectecting unknown malicious code by applying classification techniques on OpCode patterns," Security Informatics a Springer Open Journal, 2012, vol. 1 (1), pp. 1-22.

Kachirski O., et al., "Effective Intrusion Detection Using Windows Sensors in Wireless Ad Hoc Networks", IEEE Proceedings of the 36th Hawaii International Conference on System Sciences, 2002, 8 pages.

Kirda E., et al., "Behavior-Based Spyware Detection", 15th USENIX Security Symposium, 2002, pp. 273-288.

Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.

Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009, pp. 675-678, XP055107983, DOI: 10.1109/WI-IAT.2009.113 the whole document.

Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007, pp. 516-520, XP031200055, DOI: 10.1109/WI-IATW.2007.52 the whole document.

Miluzzo E., et al., "Vision: mClouds—computing on clouds of mobile devices", Proceedings of the 3rd ACM Workshops on Mobile Cloud Computing and Services (MSC'12), Jun. 25, 2012, pp. 9-14, XP055107956, DOI: 10.1145/2307849.2307854 the whole document.

Schmidt A.D., et al., "Static analysis of executables for collaborative malware detection on android", Proceedings of the 2009 IEEE International Conference on Communications (ICC'09), Jun. 14, 2009, 3 Pages, XP031506460, DOI: 10.1109/ICC.2009.5199486 the whole document.

Shabtai A., et al., "A Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1]-paragraph [5.3.4].

Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.

Tabish S.M., "Malware detection using statistical analysis of byte-level file content", Proceedings of the ACM SIGKDD Workshop on Cybersecurity and Intelligence Informatics (CSI-KDD'09), Jun. 28, 2009, pp. 23-31, XP055107225, DOI: 10.1145/1599272.1599278 the whole document.

(56) References Cited

OTHER PUBLICATIONS

Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.

De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.

Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412.2364435, Section 5.

Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.

Gavin McWilliams: "Malware detection methods for fixed and mobile networks", Centre for Secure Information Technologies—Queen's University Belfast, Jan. 23, 2013, pp. 1-21, XP017577639, [retrieved on Jan. 23, 2013] the whole document.

Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/Jarle Kittilsen.pdf [retrieved on Dec. 14, 2012] the whole document.

Kolter J.Z., et al., "Learning to Detect Malicious Executables in the Wild", ACM Knowl. Discovery and Data Mining (KDD), 2004, pp. 470-478.

Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.

Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-445X, DOI: 10.1109/AINA.2013.88 ISBN: 978-1-4673-5550-6 [retrived on Jun. 13, 2013] the whole document.

Kaspersky Endpoint Security 8 for Smartphone Program Version 8.0, Updated on Feb. 8, 2012.

Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9, 1999-May 12, 1999.

Tan, P.N., et al., "Introduction to data mining," Library of Congress, 2006, Chapter 4.

Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27, 2008-Aug. 1, 2008, pp. 160-165.

\* cited by examiner

METHODS AND SYSTEMS FOR MINIMIZING LATENCY OF BEHAVIORAL ANALYSIS

RELATED APPLICATIONS

This application claims the benefit of priority to U.S. Provisional Patent Application No. 61/646,590 entitled "System, Apparatus and Method for Adaptive Observation of Mobile Device Behavior" filed May 14, 2012; and U.S. Provisional Application No. 61/683,274, entitled "System, Apparatus and Method for Adaptive Observation of Mobile Device Behavior" filed Aug. 15, 2012, the entire contents of both which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, correcting the conditions and/or mobile device behaviors that may negatively impact the mobile device's long term and continued performance and power utilization levels is beneficial to consumers.

SUMMARY

The various embodiments include methods and mobile devices configured for improving the performance of mobile devices based on whether observed mobile device behaviors match behavior signatures stored in memory. An embodiment method includes observing mobile device behaviors and generating a corrective action behavior signature based on observed mobile device behaviors, determining whether the generated behavior signature matches a behavior signature stored in a cache memory of the mobile device, and taking a corrective action in response to determining that the generated behavior signature matches a behavior signature stored in the cache memory of the mobile device. An embodiment method may further include receiving a behavior signature from a second mobile device, and storing the received behavior signature in the cache memory. An embodiment method may further include receiving a behavior signature from a network server, and storing the received behavior signature in the cache memory. An embodiment method may further include determining whether the generated behavior signature matches a behavior signature stored in a server memory of a service accessible via a network connection when it is determined that the generated behavior signature does not match a behavior signature stored in the cache memory, and taking a corrective action in response to determining that the generated behavior signature matches a behavior signature stored in a server memory of a service accessible via a network connection.

In an embodiment the cache memory may be populated by observing mobile device behaviors over a period of time to recognize mobile device behaviors that are inconsistent with normal operation patterns, determining whether a behavior signature corresponding to the observed behaviors is stored in the cache memory, identifying a limited set of behaviors associated with inconsistent operations when it is determined that a behavior signature corresponding to the observed behaviors is not stored in the cache memory, receiving behavior inputs from one or more of a high-level application, a system kernel, and a driver regarding the limited set of behaviors, receiving a context input regarding the limited set of behaviors of the mobile device, performing temporal and spatial correlations of the received behavior inputs and the received context input, generating a behavior vector based on a result of the spatial and temporal correlations generating the behavior signature based on the behavior vector, and storing the generated behavior signature in the cache memory.

In an embodiment, a mobile device may include a transceiver configured to establish a network connect, a cache memory, and a processor coupled to the transceiver and cache memory, and configured with processor-executable instructions to perform operations including observing mobile device behaviors and generating a behavior signature based on observed mobile device behaviors, determining whether the generated behavior signature matches a behavior signature stored in a cache memory of the mobile device, and taking a corrective action in response to determining that the generated behavior signature matches a behavior signature stored in the cache memory of the mobile device. In an embodiment mobile device, the processor may be configured to perform operations further including receiving a behavior signature from a second mobile device, and storing the received behavior signature in the cache memory. In an embodiment mobile device, the processor may be configured to perform operations further including embodiment method may further include receiving a behavior signature from a network server, and storing the received behavior signature in the cache memory. In an embodiment mobile device, the processor may be configured to perform operations further including embodiment method may further include determining whether the generated behavior signature matches a behavior signature stored in a server memory of a service accessible via a network connection when it is determined that the generated behavior signature does not match a behavior signature stored in the cache memory, and taking a corrective action in response to determining that the generated behavior signature matches a behavior signature stored in a server memory of a service accessible via a network connection.

In an embodiment the mobile device processor may be configured to perform operations to populate the cache memory including observing mobile device behaviors over a period of time to recognize mobile device behaviors that are inconsistent with normal operation patterns, determining whether a behavior signature corresponding to the observed behaviors is stored in the cache memory, identifying a limited set of behaviors associated with inconsistent operations when it is determined that a behavior signature corresponding to the observed behaviors is not stored in the cache memory, receiving behavior inputs from one or more of a high-level application, a system kernel, and a driver regarding the limited set of behaviors, receiving a context input regarding the limited set of behaviors of the mobile device, performing temporal and spatial correlations of the received behavior inputs and the received context input, generating a behavior vector based on a result of the spatial and temporal correlations generating the behavior signature based on the behavior vector, and storing the generated behavior signature in the cache memory.

An embodiment mobile device may include means for performing the functions of the embodiment methods described above. A further embodiment may include a non-transitory processor-readable storage medium on which are stored processor-executable instructions configured to cause a mobile device processor to perform the functions of the embodiment methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
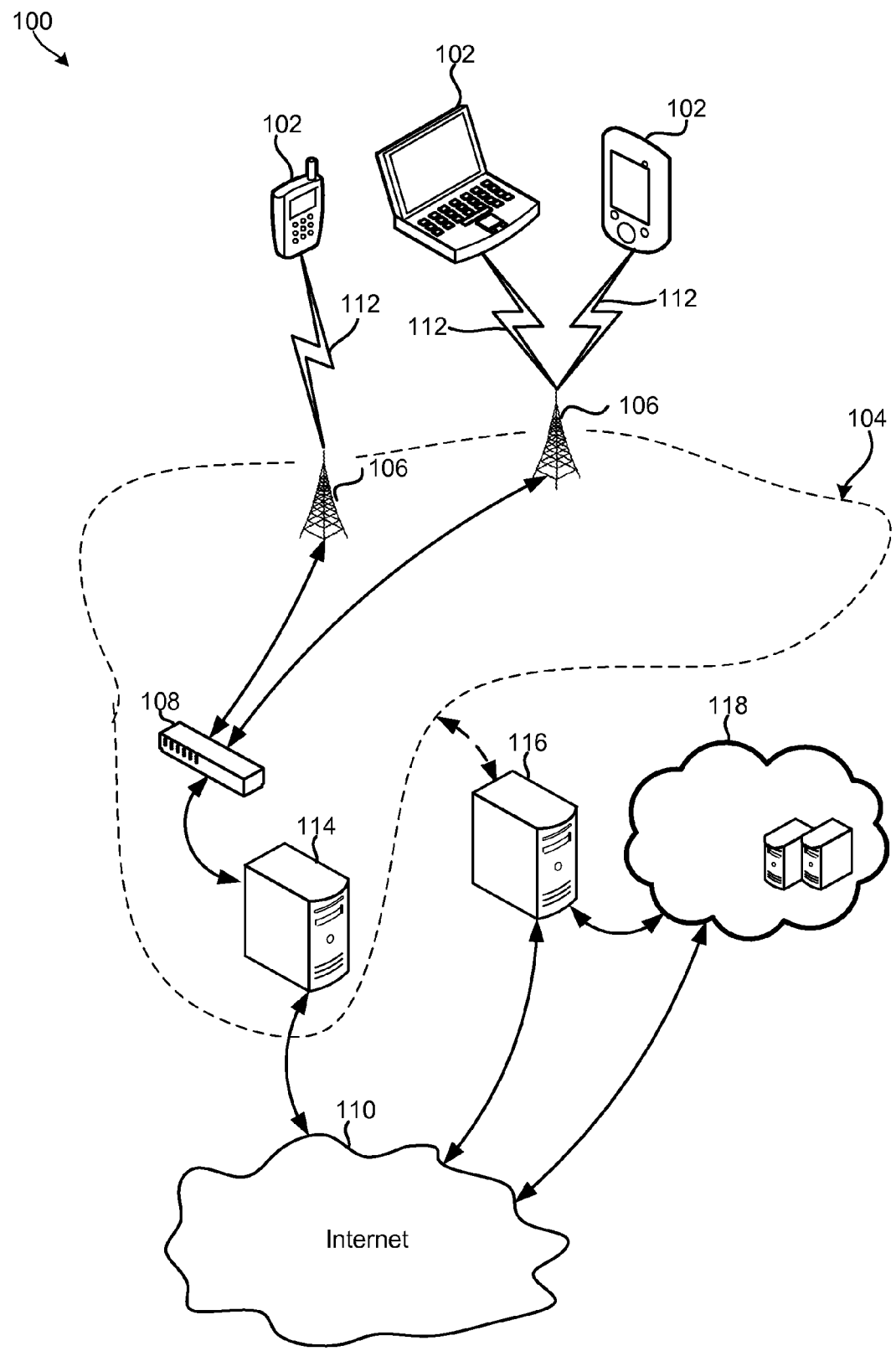
FIG. 1 is a communication system block diagram illustrating network components of an example telecommunication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery power, the aspects are generally useful in any electronic device that includes a processor and executes application programs.

The terms "performance-degrading" and "performance degradation" are used herein to refer to a wide variety of undesirable mobile device operations and characteristics, such as longer processing times, lower battery life, loss of private data, malicious economic activity (e.g., sending unauthorized premium SMS message), operations relating to commandeering the mobile device or utilizing the phone for spying or botnet activities, etc.

The various aspects include mobile devices, systems, and methods for efficiently identifying, analyzing, classifying, modeling, preventing, and/or correcting the conditions and/or mobile device behaviors that often degrade a mobile device's performance and/or power utilization levels over time.

The various aspects include methods, systems, and devices configured to make use of caching techniques and behavior signature caches to improve processor performance and/or reduce the amount of power consumed by the computing device by reducing analyzer latency, which is the amount of time required for the mobile device to process and analyze behavior information to determine whether a particular mobile device behavior, software application, or process is benign, suspicious, malicious, or performance-degrading. The various aspects may include a signature caching system configured to adapt to rapid and frequent changes in behavioral specifications and models, such as those produced in (or used by) a machine learning classifier or analyzer module of the mobile device. This signature caching system may also provide a multi-fold improvement in the scalability of behavioral analysis operations performed on the mobile device.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time, such as when the performance degradation is not caused by viruses or malware. For these and other reasons, existing anti-virus, firewall, and encryption products do not provide adequate solutions for identifying the numerous factors that may contribute to a mobile device's degradation over time, for backing up the mobile device, for preventing mobile device degradation, or for efficiently restoring an aging mobile device to its original condition.

Various solutions exist for modeling the behavior of processes or application programs executing on a computing device, and such behavior models may be used to differentiate between malicious and benign process/programs on computing devices. However, these existing modeling solutions are not suitable for use on mobile devices because such solutions generally require the execution of computationally-intensive processes that consume a significant amount of processing, memory, and energy resources, all of which may be scarce on mobile devices. In addition, these solutions are generally limited to evaluating the behavior of individual application programs or processes, and do not provide an accurate or complete model of the performance-degrading mobile device behaviors. For these and other reasons, existing modeling solutions are not adequate for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems, and there are a large variety of factors that may contribute to the degradation in performance and power utilization levels of a mobile device over time, including poorly designed software applications, malware, viruses, fragmented memory, background processes, etc. Due to the number, variety, and complexity of these factors, it is often not feasible to evaluate all the factors that may contribute to the degradation in performance and/or power utilization levels of the complex yet resource-constrained systems of modern mobile devices.

The various aspects include mobile devices, systems, and methods for efficiently identifying, analyzing, classifying, modeling, preventing, and/or correcting the conditions and/or mobile device behaviors that often degrade a mobile device's performance and/or power utilization levels over time from a limited (coarse) set of behavior observations. By storing signatures and information on such conditions and corrective actions in a cache memory and/or a central database, such as the "cloud," and enabling mobile devices to quickly access and use this information, the various aspects enable mobile devices to react to performance-limiting and undesirable operating conditions much faster and with lower power consumption than would otherwise be possible if the mobile device had to analyze all behaviors for their potential effect on performance. In other words, caching the signature and information that can be used to recognize benign or not-benign behaviors based on more thorough analyses, mobile devices may be able to promptly recognize non-benign or suspicious behaviors/operating conditions.

In an aspect, an observer process, daemon, module, or sub-system (herein collectively referred to as a "module") of the mobile device may instrument or coordinate various application programming interfaces (APIs) at various levels of the mobile device system, and collect behavior information from the instrumented APIs. The observer module may constantly monitor the mobile device (via a low power process, background processes, etc.) to identify the normal operation patterns of the mobile device and/or to identify behaviors that are not consistent with previously computed normal operation patterns. An analyzer module of the mobile device may analyze and/or classify the collected behavior information, generate behavior vectors, generate spatial and/or temporal correlations based on the behavior vector and information collected from various other mobile device sub-systems, and determine whether a particular mobile device behavior, software application, or process is benign, suspicious, or malicious/performance-degrading. The generated behavior vectors, and spatial and temporal correlations may also be used by various modules (e.g., by an actuation module, etc.) of the mobile device to recognize, identify, and/or respond to behaviors that are determined to have a high probability of negatively impacting the mobile device's performance or battery consumption levels.

In an aspect, the observer module may be configured to communicate (e.g., via a memory write operation, function call, API, etc.) the collected behavior information to a behavior vector cache module (e.g., via a memory write operation, etc.). Such a behavior vector cache module may generate a behavior signature from the collected behavior information and determine whether the generated behavior signature matches or corresponds to a behavior vector stored in a behavior vector cache/memory. The generated behavior signature may succinctly describe observed behavior of the mobile device, software application, or process in a value or vector data-structure (e.g., in the form of a string of numbers, etc.). In an aspect, the behavior signature may function as an identifier and/or a certification that enables the mobile device system to quickly recognize, identify, verify, confirm, and/or trust that an observed behavior has previously been analyzed and classified, without requiring the mobile device to perform any additional, cumbersome, or power intensive analysis or verification operations. Since the behavior signature may be compared to certain operating state parameters by the mobile device processor to recognize that a performance reducing situation exists, the use of cached behavior signatures may reduce the "analyzer latency," which is the amount of time that the analyzer module would require to receive behavior information collected by the observer module, process the received behavior information, and generate output suitable for use in determining whether observed behaviors are benign, suspicious, malicious, or performance-degrading.

Generally, a mobile device will become less responsive and/or more susceptible to performance degradation as its analyzer latency increases, and thus it is beneficial to consumers to reduce the analyzer latency of a mobile device. For example, a mobile device may be configured to either allow, restrict, or block the operations of one or more mobile device sub-systems, applications, or processes while the mobile device performs behavior analysis operations to determine whether a particular mobile device behavior, software application, or process is benign, suspicious, malicious, or performance-degrading. If the mobile device allows an application to continue operating while the mobile device performs the behavior analysis operations, a high/large analyzer latency may provide sufficient time for a malicious application to complete its malicious operations before it is blocked. On the other hand, if the mobile device restricts or blocks the application, a high/large analyzer latency may impede the progress of a benign application and/or reduce the responsiveness of the mobile device (and thus degrade the user experience). Therefore, regardless of whether mobile device is configured to allow, restrict, or block the operations of the applications or process, reducing the analyzer latency will be beneficial to mobile device users.

Various aspects make use of caching techniques and behavior signature caches to reduce analyzer latency. In an aspect, the mobile device system may be configured to reduce analyzer latency by circumventing the analyzer module and directly invoking the operations of the actuation module (which may respond immediately to known/detected behaviors) when a signature generated for an observed behavior, application or process matches or corresponds to an entry in a cache. In an aspect, the mobile device system may be configured so that the cache lookup or comparison is performed very fast and efficiently, further reducing analyzer latency. In an aspect, the behavior signature caching operations may be performed in a manner that is similar to DNS caching, which locally caches the results of a query received from a network server. Thus, in various aspects, the behavior signature may be cached on the mobile device, to the network server (i.e., located on the cloud), or both.

In an aspect, the mobile device system may be configured to invoke the operations of the analyzer module when the mobile device determines that the behavior vector cache does not store an entry that matches or corresponds to the generated behavior signature. The analyzer module may pull or receive the collected behavior information, generate behavior vectors, generate spatial and/or temporal correlations based on the behavior vector and information collected from various other mobile device sub-systems, generate output suitable for use in determining whether a particular mobile device behavior is benign, suspicious, malicious, or performance-degrading, store the output in the behavior vector cache, and/or call or invoke the operations of the actuation module. The actuation module may then take corrective actions or respond to behaviors that are determined to have a high probability of negatively impacting the mobile device's performance or battery consumption levels.

In an aspect, the mobile device system may be configured to store the generated behavior vector and/or behavior signature in the behavior vector cache when the mobile device determines that the cache does not store an entry that corresponds to the behavior signature. Working off line or in parallel, the analyzer module may pull the information from the behavior vector cache, generate spatial and/or temporal correlations based on information included in the behavior vector, and store the results back in the cache. By working from the behavior vector cache the analyzer module can accomplish its processing while the mobile device continues generating behavior signatures and comparing them to cache entries. In this way, the latency associated with processing the behavior vectors in the analyzer module is removed from the analyzer latency of the mobile device, and the analyzer latency is reduced.

In an aspect, the mobile device may be configured to communicate with a network server that includes an online behavior signature database. The network server may receive a large number of reports from many mobile devices and analyze, consolidate or otherwise turn such crowd-sourced information into useable information (e.g., behavior models, behavior vectors, signatures, etc.) that can be used or accessed by all mobile devices. The network server may continuously reevaluate existing data/behavior models, vectors, and signatures as new behavior/analysis reports are received from mobile devices, and/or generate new or updated models, vectors, or signatures based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

The behavior signature caching operations may improve the scalability of the behavioral analysis, without degrading the system performance or battery life. In the case of a cloud-based analyzer/caching (e.g., via the network server), the savings of behavior signature caching can be even more significant. Different mobile devices will learn different behaviors based on the apps they run, as well as based on the classifier variations across devices. Sharing this signature caching information among many mobile devices will allow one device in the system to detect malicious behavior and provide a signature to all other devices in the system, thereby enabling all other devices in the system to rapidly recognize malicious or malfunctioning apps and promptly take action to prevent or correct undesirable behavior with very little analysis latency (i.e., just the latency of a table look up operation).

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE, and/or other cell telephone communication technologies. The telephone network 104 may also include one or more servers 114 coupled to or within the network operations center 108 that provide a connection to the Internet 110.

The communication system 100 may further include network servers 116 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communications between the network server 116 and the mobile devices 102 may be achieved through the telephone network 104, the internet 110, private network (not illustrated), or any combination thereof.

The mobile device 102 may be configured to generate behavior models, vectors, and/or signatures and send the generated models, vectors, and signatures to the network server 116 (e.g., via the telephone network 104) for analysis and/or storage. Likewise, the network server 116 may be configured to send the stored models, vectors, and signatures to the mobile device 102, which may receive and use the behavior models, vectors, and signatures to reduce its analyzer latency.

Figure 2:
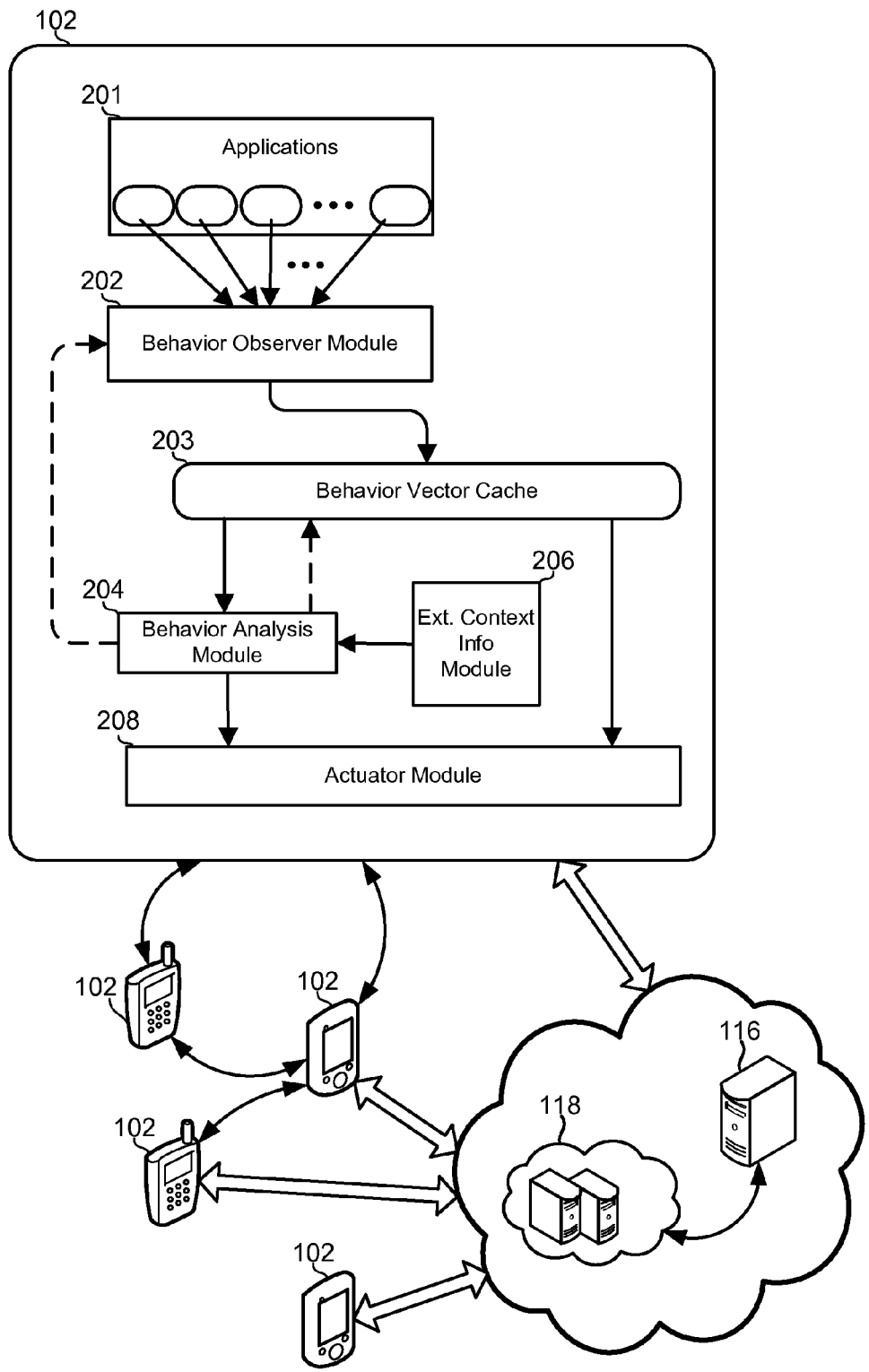
FIG. 2 is a block diagram illustrating example logical components and information flows in an aspect mobile device configured to determine whether a particular mobile device behavior, software application, or process is performance-degrading, suspicious, or benign.

FIG. 2 illustrates example logical components and information flows in an aspect mobile device 102 configured to determine whether a particular mobile device behavior, software application, or process is malicious/performance-degrading, suspicious, or benign. In the example illustrated in FIG. 2, the mobile device 102 includes a plurality of software applications 201, a behavior observer module 202, a behavior vector cache module 203, a behavior analyzer module 204, an external context information module 206, and an actuator module 208. In an aspect, the behavior vector cache module 203 may be included as part of the behavior observer module 202.

Each of the modules 202-208 may be implemented in software, hardware, or any combination thereof. In various aspects, the modules 202-208 may be implemented within parts of the operating system (e.g., within the kernel, in the kernel space, in the user space, etc.), within separate programs or applications, in specialized hardware buffers or processors, or any combination thereof. In an aspect, one or more of the modules 202-208 may be implemented as software instructions executing on one or more processors of the mobile device 102.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, cache memory, etc.) and/or send (e.g., via memory writes, function calls, etc.) the generated observations to the behavior vector cache module 203 or the behavior analyzer module 204.

In an aspect, the behavior observer module 202 may be configured to generate a behavior signature based on observed mobile device behaviors and store the signature in a behavior vector cache (e.g., via the behavior vector cache module 203). In an aspect, the behavior observer module 202 may be configured to communicate (e.g., via a memory write operation, function call, etc.) the collected behavior information to the behavior vector cache module 203, which may generate a behavior signature from the received behavior information and determine whether the generated behavior signature matches or corresponds to a behavior vector stored in a behavior vector cache/memory. The generated behavior signature may succinctly describe observed behavior of the mobile device, software application, or process in a value or vector data-structure (e.g., in the form of a string of numbers, etc.), and/or function as an identifier enables the mobile device 102 to quickly determine whether an observed behavior is benign, suspicious, malicious, or performance degrading.

The behavior observer module 202 may monitor/observe mobile device operations and events by collecting information pertaining to library application programming interface (API) calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors from a network server 116 and/or a component in a cloud service provider network 118. In an aspect, the initial set of behaviors/factors may be specified in data/behavior models received from the network server 116 or cloud service provider network 118.

The behavior analyzer module 204 may be configured to receive the observations from the behavior vector cache module 203 or pull the observations from the behavior vector cache. The behavior analyzer module 204 may also be configured to receive observations, behavior signatures, behavior vectors, models, and/or additional information from a third party network server 116 and/or a component in a cloud service or network 118. The behavior analyzer module 204 may compare the received information (e.g., signatures) with information stored in the behavior vector cache to identify subsystems, processes, and/or applications that are contributing to (or are likely to contribute to) the device's degradation over time, or which may otherwise cause problems on the device.

In various aspects, the mobile device 102 may be configured to receive behavior signatures from other mobile devices 102, which may be included in or accessed through a local network, WiFi direct, a peer-to-peer connection, an enterprise local area network, a secure ad-hoc network (e.g., military deployment), or sharing of a common higher layer structure (e.g., enterprise connected over a virtual private network). In this manner, the mobile devices 102 may benefit from learned knowledge of other mobile devices 102 in the same network.

In an aspect, the mobile device 102 may be configured to automatically locate and form a group with other mobile devices 102 in the same vicinity. The mobile devices 102 may be further configured to automatically select or elect a group-owner (GO), which may be responsible for generating, maintaining, and communicating an advertizing schedule that identifies when each mobile device 102 in the group is to broadcast or transmit behavior signatures or vectors stored in their respective behavior signature caches. Each mobile device 102 may broadcast the contents of its behavior signature cache at the scheduled time, and the remaining mobile devices 102 in the group may receive and update their behavior signature cache with the received behavior vectors and signatures. In this manner, all the mobile devices 102 in the group may benefit from learned knowledge of each of the other mobile devices 102.

In various aspects, the mobile device 102 may be configured to receive behavior signatures from the network server 116 or cloud service provider network 118, which may be included in or accessed through the Internet 110, a local network (e.g., WiFi direct, P2P, etc.), an enterprise local area network, a secure ad-hoc network (e.g., military deployment), or sharing of a common higher layer structure (e.g., enterprise connected over VPN). The network server 116 may receive a large number of behavior reports, vectors, or signatures from many mobile devices 102 and analyze, consolidate or otherwise turn such crowd-sourced information into useable information (e.g., behavior models, behavior vectors, signatures, etc.) that can be used or accessed by all mobile devices. The network server 116 may send the generated models, vectors, and signatures to the mobile device 102, which may receive and implement, apply, or use the information to identify benign, malicious, or performance-degrading mobile device behaviors without consuming an excessive amount of processing, memory, or energy resources of the mobile device 102. The mobile device 102 may then correct or prevent the identified malicious or performance-degrading mobile device behaviors from degrading the performance and power utilization levels of the mobile device.

In an aspect, the behavior analyzer module 204 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, generate one or more behavior vectors based the results of the comparisons, and compare the generated behavior vectors to other behavior models to determine whether a particular mobile device behavior, software application, or process is performance-degrading/malicious, benign, or suspicious.

When the behavior analyzer module 204 determines that a behavior, software application, or process is malicious or performance-degrading, the behavior analyzer module 204 may notify the actuator module 208, which may perform various actions or operations to correct mobile device behaviors determined to be malicious or performance-degrading and/or perform operations to heal, cure, isolate, or otherwise fix the identified problem. In an aspect, the behavior analyzer module 204 may also store the generated behavior vectors and/or signatures in the behavior vector cache (e.g., via the behavior vector cache module 203), which allows the system to circumvent the behavior analyzer module 204 and directly invoke the operations of the actuation module (which may respond immediately to known/detected behaviors) the next time that the same or similar behavior, software application, or process is observed. In this manner, the various aspects avoid re-analyzing the same or similar mobile device behaviors, thereby reducing the analyzer latency.

In an aspect, when the behavior analyzer module 204 determines that a behavior, software application, or process is suspicious, the behavior analyzer module 204 may notify the behavior observer module 202. In response, the behavior observer module 202 may adjust the granularity of its observations (i.e., the level of detail at which mobile device behaviors are observed) and/or change the behaviors that are observed based on information received from the analyzer module 204 (e.g., results of the real-time analysis operations), generate or collect new or additional behavior information, and send the new/additional information to the behavior analyzer module 204 for further analysis/classification. Such feedback communications between the observer module 202 and the behavior analyzer module 204 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity.

Figure 3:
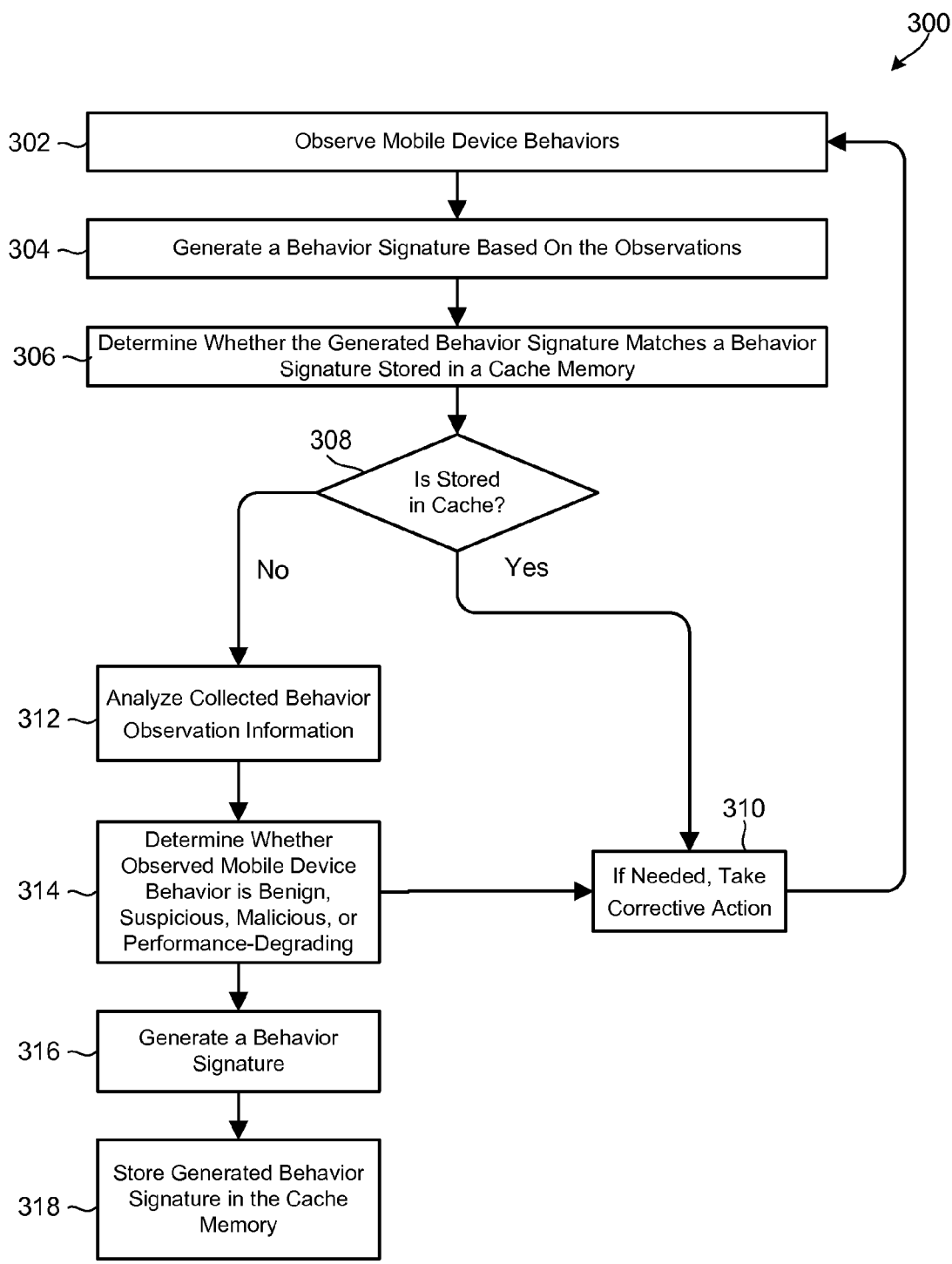
FIG. 3 is a process flow diagram illustrating an aspect mobile device method of using caching to reduce analyzer latency.

FIG. 3 illustrates an aspect mobile device method 300 of identifying and responding to benign, suspicious, malicious, or performance-degrading mobile device behaviors. In block 302, a mobile device processor may observe mobile device behaviors over a period of time and collect behavior information suitable for use in identifying mobile device behaviors that are inconsistent with normal operation patterns. In block 304, the mobile device processor may generate a behavior signature from the collected behavior information. In blocks 306-308, the mobile device processor may determine whether the generated behavior signature matches, approximately matches or otherwise corresponds to a behavior vector stored in a behavior vector cache/memory. In an aspect, the behavior signature may be generated to succinctly describe observed behavior of the mobile device, software application, or process in a value or vector data-structure (e.g., in the form of a string of numbers, etc.).

If the mobile device processor determines that the generated behavior signature matches or corresponds to a behavior vector stored in a behavior vector cache/memory (i.e., determination block 308="Yes"), in block 310, the mobile device processor may respond immediately to known/detected behaviors identified from the information stored in the cache/memory. On the other hand, if the mobile device processor determines that the generated behavior signature does not correspond to a behavior vector stored in a behavior vector cache/memory (i.e., determination block 308="No"), in block 312, the mobile device processor may analyze and/or classify the collected behavior information, generate behavior vectors, generate spatial and/or temporal correlations based on the behavior vector and information collected from various other mobile device sub-systems. In bock 314, the mobile device processor may determine whether the observed mobile device behavior is benign, suspicious, malicious, or performance-degrading. In block 310, the mobile device processor may respond to the observed mobile device behaviors determined to be malicious or performance-degrading.

In block 316, the mobile device processor may generate a behavior signature suitable for use in quickly identifying the observed and analyzed behavior, and verifying that the behavior has previously been analyzed and classified, without requiring the mobile device to perform any additional, cumbersome, or power intensive analysis or verification operations. In block 318, the mobile device processor may store the generated behavior signature in the cache memory.

Figure 4:
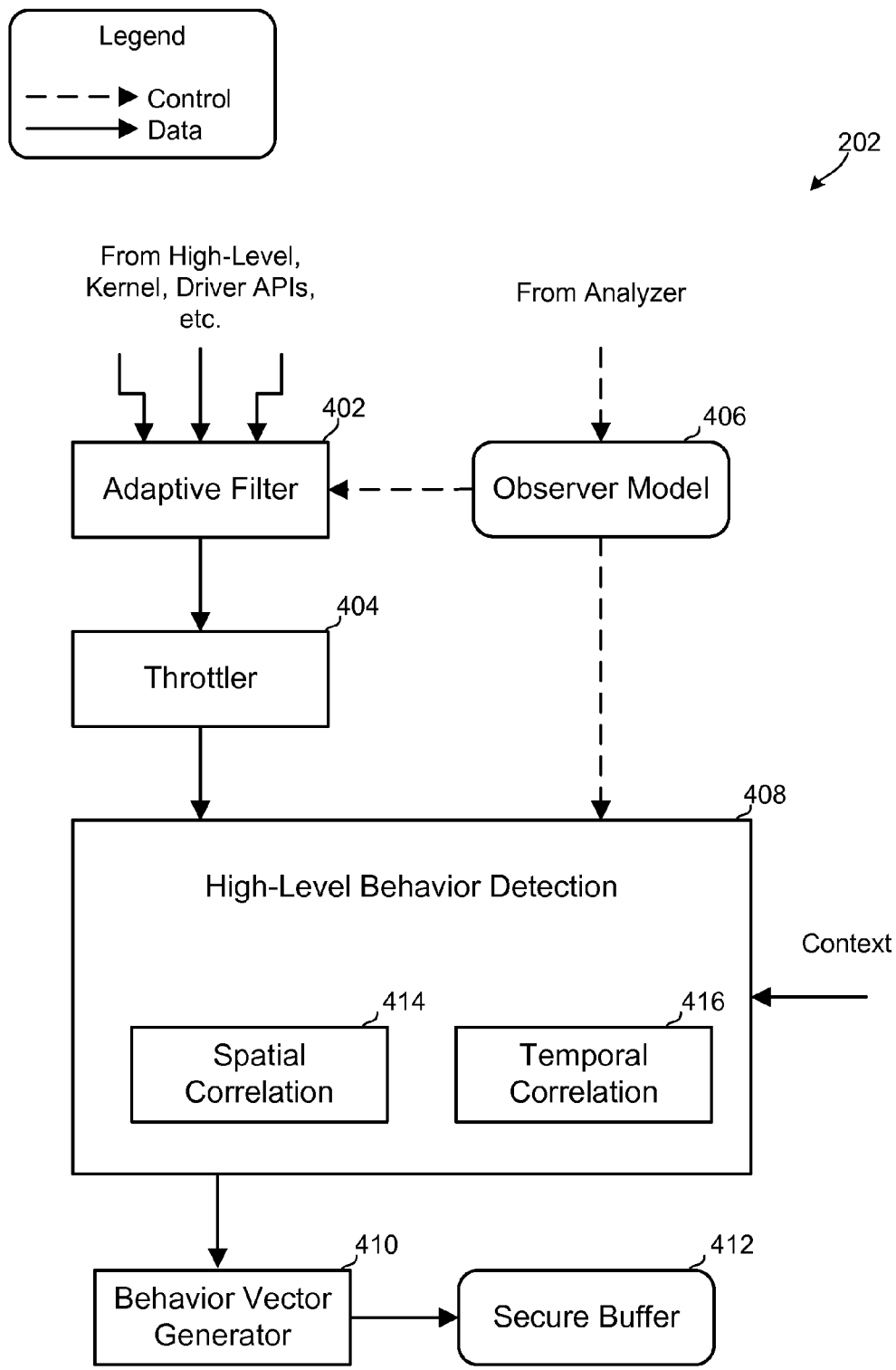
FIG. 4 is a block diagram illustrating example logical components and information flows in an observer module configured to perform dynamic and adaptive observations to generate information suitable for use in generating a signature in accordance with an aspect.

FIG. 4 illustrates example logical components and information flows in a behavior observer module 202 of a computing system configured to perform dynamic and adaptive observations in accordance with an aspect. The behavior observer module 202 may include an adaptive filter module 402, a throttle module 404, an observer mode module 406, a high-level behavior detection module 408, a behavior vector generator 410, and a secure buffer 412. The high-level behavior detection module 408 may include a spatial correlation module 414 and a temporal correlation module 416.

The observer mode module 406 may receive control information from various sources, which may include an analyzer unit (e.g., the behavior analyzer module 204 described above with reference to FIG. 2) and/or an application API. The observer mode module 406 may send control information pertaining to various observer modes to the adaptive filter module 402 and the high-level behavior detection module 408.

The adaptive filter module 402 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 404, which may be responsible for controlling the amount of information flowing from the filter to ensure that the high-level behavior detection module 408 does not become flooded or overloaded with requests or information.

The high-level behavior detection module 408 may receive data/information from the throttle module 404, control information from the observer mode module 406, and context information from other components of the mobile device. The high-level behavior detection module 408 may use the received information to perform spatial and temporal correlations to detect or identify high level behaviors that may cause the device to perform at sub-optimal levels. The results of the spatial and temporal correlations may be sent to the behavior vector generator 410, which may receive the correlation information and generate a behavior vector that describes the behaviors of a particular process, application, or sub-system. In an aspect, the behavior vector generator 410 may generate the behavior vector such that each high-level behavior of a particular process, application, or sub-system is an element of the behavior vector. In an aspect, the generated behavior vector may be stored in a secure buffer 412. Examples of high-level behavior detection may include detection of the existence of a particular event, the amount or frequency of another event, the relationship between multiple events, the order in which events occur, time differences between the occurrence of certain events, etc.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide variety of sources.

As discussed above, the behavior observer module 202 may perform adaptive observation techniques, and control the observation granularity based on information received from a variety of sources. For example, the high-level behavior detection module 408 may receive information from the throttle module 404, the observer mode module 406, and context information received from other components (e.g., sensors) of the mobile device. As an example, a high-level behavior detection module 408 performing temporal correlations might detect that a camera has been used and that the mobile device is attempting to upload the picture to a server. The high-level behavior detection module 408 may also perform spatial correlations to determine whether an application on the mobile device took the picture while the device was holstered and attached to the user's belt. The high-level behavior detection module 408 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 408 may recognize this as a potentially threatening behavior and initiate an appropriate response (e.g., shutting off the camera, sounding an alarm, etc.).

In an aspect, the behavior observer module 202 may be implemented in multiple parts.

Figure 5:
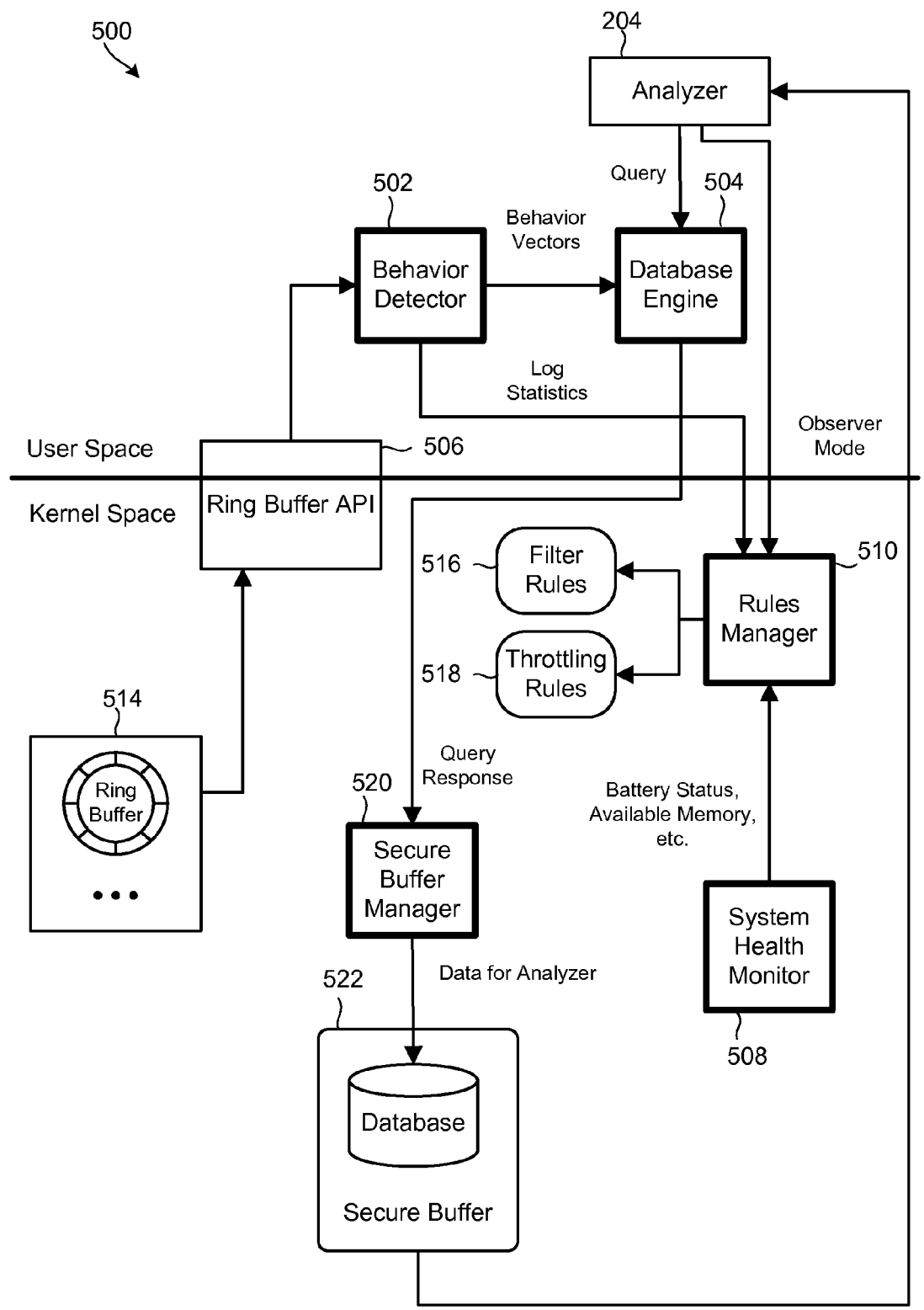
FIG. 5 is a block diagram illustrating logical components and information flows in a computing system implementing observer daemons in accordance with an aspect.

FIG. 5 illustrates logical components and information flows in a computing system 500 implementing an aspect observer daemon. In the example illustrated in FIG. 5, the computing system 500 includes a behavior detector 502 module, a database engine 504 module, and an behavior analyzer module 204 in the user space, and a ring buffer 514, a filter rules 516 module, a throttling rules 518 module, a secure buffer manager 520, and a secure buffer 522 in the kernel space. The computing system 500 may further include an observer daemon that includes the behavior detector 502 and the database engine 504 in the user space, and the secure buffer manager 520, the rules manager 510, and the system health monitor 508 in the kernel space. The computing system 500 may further include a ring buffer API 506 for communicating information stored in the ring buffer 514 to the behavior detector 502 module.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 6:
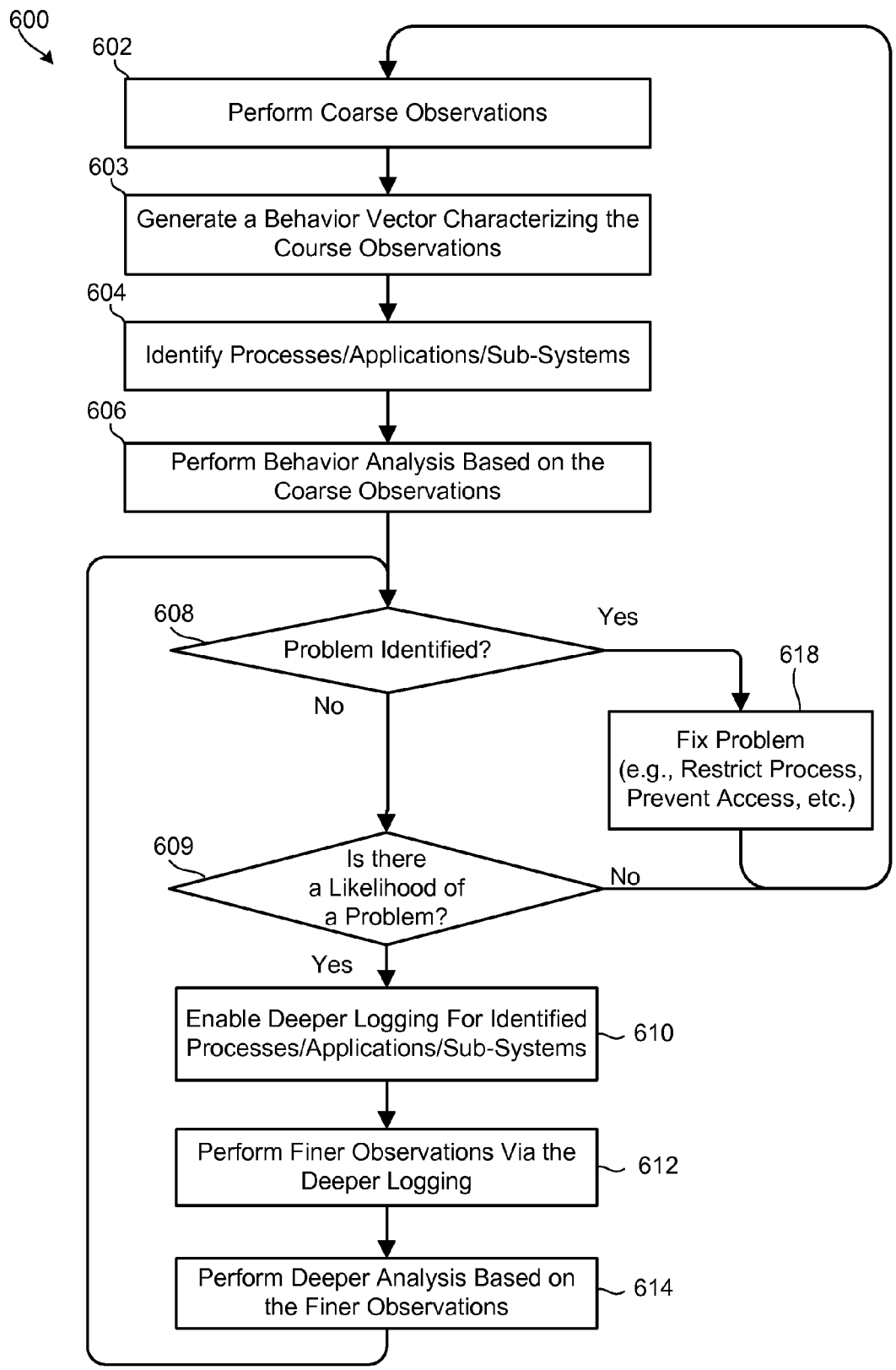
FIG. 6 is a process flow diagram illustrating an aspect method for performing adaptive observations on mobile devices.

FIG. 6 illustrates an example method 600 for performing dynamic and adaptive observations in accordance with an aspect. In block 602, the mobile device processor may perform coarse observations by monitoring/observing a subset of large number factors/behaviors that could contribute to the mobile device's degradation. In block 603, the mobile device processor may generate a behavior vector characterizing the coarse observations and/or the mobile device behavior based on the coarse observations. In block 604, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 606, the mobile device processor may perform behavioral analysis operations based on the coarse observations. In an aspect, as part of blocks 602-606, the mobile device processor may perform one or more of the operations discussed above with reference to FIG. 3.

In determination block 608, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 608="Yes"), in block 618, the processor may initiate a process to correct the behavior and return to block 602 to perform additional coarse observations.

When the mobile device processor determines that the suspicious behaviors or potential problems cannot be identified and/or corrected based on the results of the behavioral analysis (i.e., determination block 608="No"), in determination block 609 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 609="No"), the processor may return to block 602 to perform additional coarse observations.

When the mobile device processor determines that there is a likelihood that suspicious behaviors or potential problems exist and/or are detectable (i.e., determination block 609="Yes"), in block 610, the mobile device processor may perform deeper logging/observations or finer logging on the identified subsystems, processes or applications. In block 612, the mobile device processor may perform deeper and more detailed observations on the identified subsystems, processes or applications. In block 614, the mobile device processor may perform further and/or deeper behavioral analysis based on the deeper and more detailed observations. In determination block 608, the mobile device processor may again determine whether the suspicious behaviors or potential problems can be identified and corrected based on the results of the deeper behavioral analysis. When the mobile device processor determines that the suspicious behaviors or potential problems cannot be identified and corrected based on the results of the deeper behavioral analysis (i.e., determination block 608="No"), the processor may repeat the operations in blocks 610-614 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 608="Yes"), in block 618, the mobile device processor may perform operations to correct the problem/behavior, and the processor may return to block 602 to perform additional operations.

In an aspect, as part of blocks 602-618 of method 600, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 7:
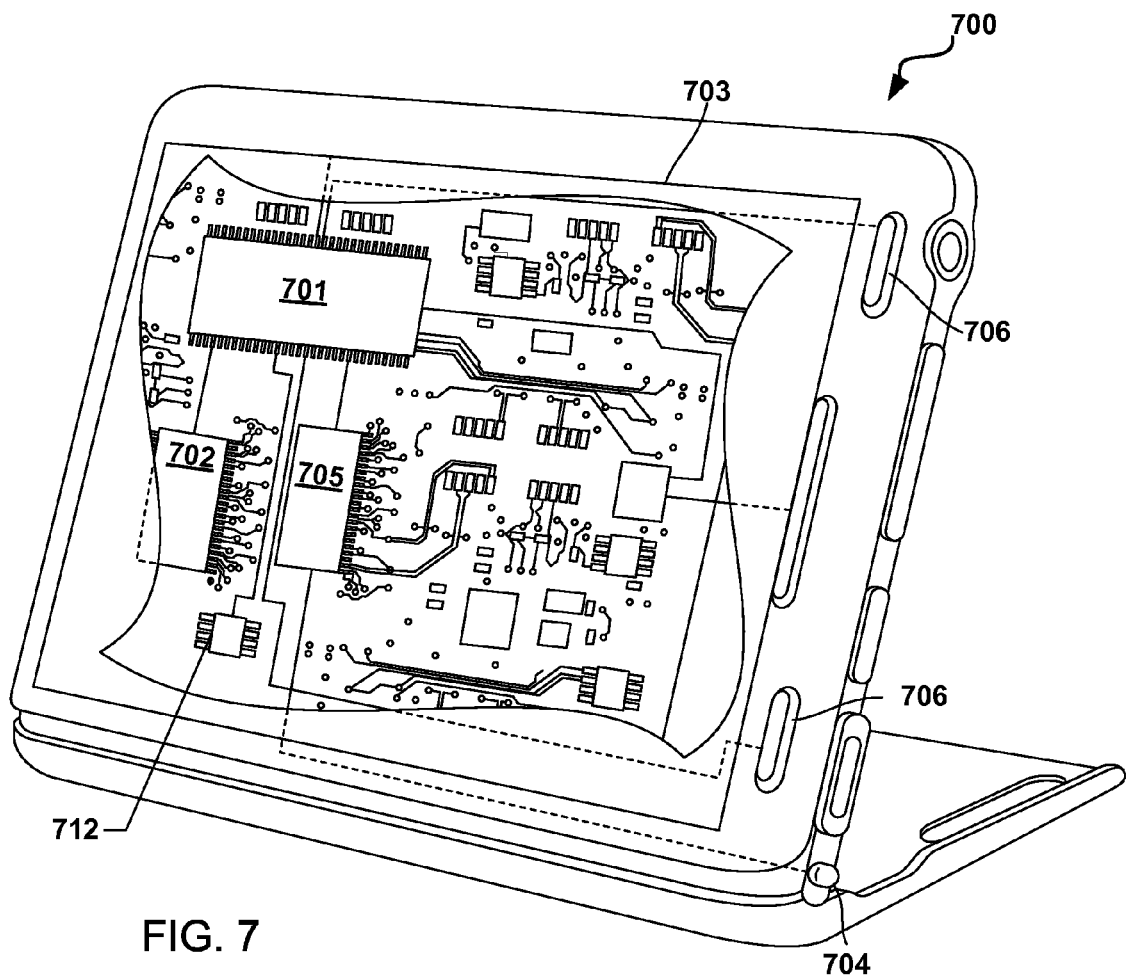
FIG. 7 is a component block diagram of a mobile device suitable for use in an aspect.

The various aspects may be implemented on a variety of mobile computing devices, an example of which is illustrated in FIG. 7 in the form of a smartphone. A smartphone 700 may include a processor 701 coupled to internal memory 702, a display 703, and to a speaker. Additionally, the smartphone 700 may include an antenna 704 for sending and receiving electromagnetic radiation that may be connected to a wireless data link and/or cellular telephone transceiver 705 coupled to the processor 701. Smartphones 700 typically also include menu selection buttons or rocker switches 706 for receiving user inputs.

A typical smartphone 700 also includes a sound encoding/decoding (CODEC) circuit 712, which digitizes sound received from a microphone into data packets suitable for wireless transmission and decodes received sound data packets to generate analog signals that are provided to the speaker to generate sound. Also, one or more of the processor 701, wireless transceiver 705 and CODEC 712 may include a digital signal processor (DSP) circuit (not shown separately).

Figure 8:
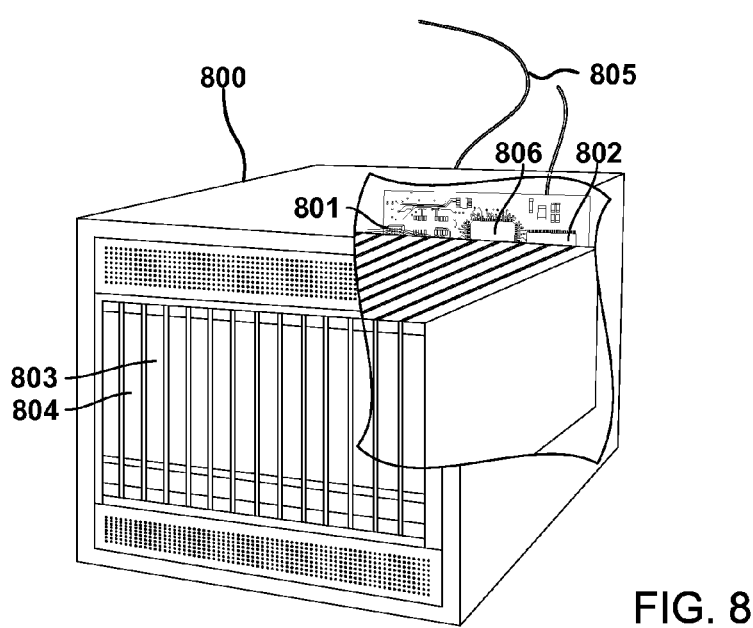
FIG. 8 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 805, such as a local area network coupled to other broadcast system computers and servers.

The processors 701, 801 may be any programmable microprocessor, microcomputer or multiple processor chip or chips that can be configured by software instructions (applications) to perform a variety of functions, including the functions of the various aspects described below. In some mobile devices, multiple processors 701 may be provided, such as one processor dedicated to wireless communication functions and one or more processors dedicated to running other applications. Typically, software applications may be stored in the internal memory 702, 802, 803 before they are accessed and loaded into the processor 701, 801. The processor 701, 801 may include internal memory sufficient to store the application software instructions.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A mobile device, comprising:
   a transceiver configured to establish a network connection;
   a cache memory; and
   a processor coupled to the transceiver and the cache memory, and configured with processor-executable instructions to perform operations comprising:
      populating the cache memory by:
         observing a first group of mobile device behaviors over a period of time;
         determining whether the cache memory stores a behavior vector that corresponds an observed mobile device behavior; and
         identifying a limited set of behaviors that are associated with operations that are inconsistent with normal operation patterns of the mobile device, receiving inputs regarding the limited set of behaviors, performing temporal and spatial correlations of the inputs, generating a first behavior vector based on a result of the spatial and temporal correlations, and storing the first behavior vector in the cache memory in response to determining that the cache memory does not store any behavior vectors that correspond to the observed mobile device behavior; and
      performing behavior-based analysis operations comprising:
         observing a second group of mobile device behaviors;
         generating a second behavior vector based on the second group of mobile device behaviors;
         determining whether the second behavior vector matches one of the behavior vectors stored in the cache memory;
         taking a corrective action in response to determining that the second behavior vector matches one of the behavior vectors stored in the cache memory;
         using the second behavior vector to determine whether one or more behaviors in the second group of mobile device behaviors are benign in response to determining that the second behavior vector does not match any of the behavior vectors stored in the cache memory; and
         storing the second behavior vector in the cache memory in response to determining that one or more behaviors in the second group of mobile device behaviors are not benign.

2. The mobile device of claim 1, wherein the processor is configured with processor-executable instructions to perform operations further comprising:
   receiving a third behavior vector from a second mobile device; and
   storing the third behavior vector in the cache memory.

3. The mobile device of claim 1, wherein the processor is configured with processor-executable instructions to perform operations further comprising:
   receiving a third behavior vector from a network server; and
   storing the third behavior vector in the cache memory.

4. The mobile device of claim 1, wherein the processor is configured with processor-executable instructions to perform operations further comprising:
   transmitting a message to a server via the network connection to determine whether the second behavior vector matches a vector stored in a server memory of a service in response to determining that the second behavior vector does not match one of the behavior vectors stored in the cache memory; and taking the corrective action in response to determining that the second behavior vector matches one of the behavior vectors stored in the server memory.

5. A mobile device, comprising:
means for populating a cache memory of the mobile device, comprising:
means for observing a first group of mobile device behaviors over a period of time;
means for determining whether the cache memory stores a behavior vector that corresponds an observed mobile device behavior; and
means for identifying a limited set of behaviors that are associated with operations that are inconsistent with normal operation patterns of the mobile device, receiving inputs regarding the limited set of behaviors, performing temporal and spatial correlations of the inputs, generating a first behavior vector based on a result of the spatial and temporal correlations, and storing the first behavior vector in the cache memory in response to the determining that the cache memory does not store any behavior vectors that correspond to the observed mobile device behavior; and
means for performing behavior-based analysis operations, comprising:
means for observing a second group of mobile device behaviors;
means for generating a second behavior vector based on the second group of mobile device behaviors;
means for determining whether the second behavior vector matches one of the behavior vectors stored in the cache memory; and
means for taking a corrective action in response to determining that the second behavior vector matches one of the behavior vectors stored in the cache memory;
means for using the second behavior vector to determine whether one or more behaviors in the second group of mobile device behaviors are benign in response to determining that the second behavior vector does not match any of the behavior vectors stored in the cache memory; and
means for storing the second behavior vector in the cache memory in response to determining that one or more behaviors in the second group of mobile device behaviors are not benign.

6. The mobile device of claim 5, further comprising:
means for receiving a third behavior vector from a second mobile device; and
means for storing the third behavior vector in the cache memory.

7. The mobile device of claim 5, further comprising:
means for receiving a third behavior vector from a network server; and
means for storing the third behavior vector in the cache memory.

8. The mobile device of claim 5, further comprising:
means for transmitting a message to a server via a network connection to determine whether the second behavior vector matches a vector stored in a server memory of a service in response to determining that the second behavior vector does not match one of the behavior vectors stored in the cache memory; and
means for taking the corrective action in response to determining that the second behavior vector matches the vector stored in the server memory.

9. A non-transitory processor-readable storage medium having stored thereon processor-executable instructions configured to cause a processor of a mobile device to perform operations comprising:
populating a cache memory of the mobile device, comprising:
observing a first group of mobile device behaviors over a period of time;
determining whether the cache memory stores a behavior vector that corresponds an observed mobile device behavior; and
identifying a limited set of behaviors that are associated with operations that are inconsistent with normal operation patterns of the mobile device, receiving inputs regarding the limited set of behaviors, performing temporal and spatial correlations of the inputs, generating a first behavior vector based on a result of the spatial and temporal correlations, and storing the first behavior vector in the cache memory in response to determining that the cache memory does not store any behavior vectors that correspond to the observed mobile device behavior; and
performing behavior-based analysis operations, comprising:
observing a second group of mobile device behaviors;
generating a second behavior vector based on the second group of mobile device behaviors;
determining whether the second behavior vector matches one of the behavior vectors stored in the cache memory; and
taking a corrective action in response to determining that the second behavior vector matches one of the behavior vectors stored in the cache memory;
using the second behavior vector to determine whether one or more behaviors in the second group of mobile device behaviors are benign in response to determining that the second behavior vector does not match any of the behavior vectors stored in the cache memory; and
storing the second behavior vector in the cache memory in response to determining that one or more behaviors in the second group of mobile device behaviors are not benign.

10. The non-transitory processor-readable storage medium of claim 9, wherein the stored processor-executable instructions are configured to cause a processor to perform operations further comprising:
receiving a third behavior vector from a second mobile device; and
storing the third behavior vector in the cache memory.

11. The non-transitory processor-readable storage medium of claim 9, wherein the stored processor-executable instructions are configured to cause a processor to perform operations further comprising:
receiving a third behavior vector from a network server; and
storing the third behavior vector in the cache memory.

12. The non-transitory processor-readable storage medium of claim 9, wherein the stored processor-executable instructions are configured to cause a processor to perform operations further comprising:
transmitting a message to a server via a network connection to determine whether the second behavior vector matches a vector stored in a server memory of a service in response to determining that the second behavior vector does not match one of the behavior vectors stored in the cache memory; and taking the corrective action in response to determining that the second behavior vector matches the vector stored in the server memory.

13. A method of improving performance on a mobile device, comprising:
populating a cache memory of the mobile device by:
observing, by a mobile device processor, a first group of mobile device behaviors over a period of time;
determining whether the cache memory stores a behavior vector that corresponds to an observed mobile device behavior; and
identifying a limited set of behaviors that are associated with operations that are inconsistent with normal operation patterns of the mobile device, receiving inputs regarding the limited set of behaviors, performing temporal and spatial correlations of the inputs, generating a first behavior vector based on a result of the spatial and temporal correlations, and storing the first behavior vector in the cache memory in response to determining that the cache memory does not store any behavior vectors that correspond to the observed mobile device behavior; and
performing behavior-based analysis operations comprising:
observing, by the mobile device processor, a second group of mobile device behaviors;
generating, by the mobile device processor, a second behavior vector based on the second group of mobile device behaviors;
determining, by the mobile device processor, whether the second behavior vector matches the behavior vectors stored in the cache memory;
taking, by the mobile device processor, a corrective action in response to determining that the second behavior vector matches one of the behavior vectors stored in the cache memory;
using, by the mobile device processor, the second behavior vector to determine whether one or more behaviors in the second group of mobile device behaviors are benign in response to determining that the second behavior vector does not match any of the behavior vectors stored in the cache memory; and
storing the second behavior vector in the cache memory in response to determining that one or more behaviors in the second group of mobile device behaviors are not benign.

14. The method of claim 13, further comprising:
receiving, by the mobile device processor, a third behavior vector from a second mobile device; and
storing, by the mobile device processor, the third behavior vector in the cache memory.

15. The method of claim 13, further comprising:
receiving, by the mobile device processor, a third behavior vector from a network server; and
storing, by the mobile device processor, the third behavior vector in the cache memory.

16. The method of claim 13, further comprising:
determining, by the mobile device processor, whether the second behavior vector matches a vector stored in a server memory of a service accessible via a network connection in response to determining that the second behavior vector does not match one of the behavior vectors stored in the cache memory; and
taking, by the mobile device processor, the corrective action in response to determining that the second behavior vector matches the vector stored in the server memory.

* * * * *